Jan. 19, 1926.
W. F. LAWRENZ
1,570,357
DENTAL TOOTHPICK
Filed July 12, 1924
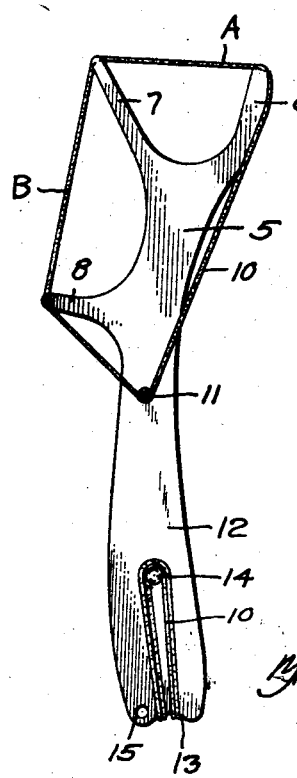
Fig. 1.
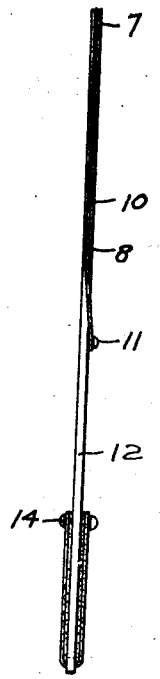
Fig. 2.
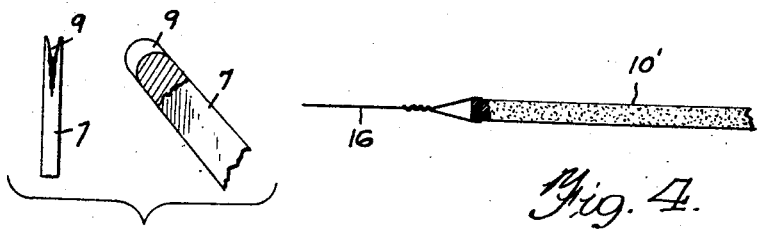
Fig. 3.
Fig. 4.
W. F. Lawrenz, Inventor
By B. P. Fishburn
Attorney

Patented Jan. 19, 1926.

1,570,357

UNITED STATES PATENT OFFICE.

WILLIAM F. LAWRENZ, OF LONG BEACH, CALIFORNIA.

DENTAL TOOTHPICK.

Application filed July 12, 1924. Serial No. 725,740.

*To all whom it may concern:*

Be it known that I, WILLIAM F. LAWRENZ, a citizen of the United States, residing at Long Beach, in the county of Los Angeles and State of California, have invented certain new and useful Improvements in Dental Toothpicks, of which the following is a specification.

My invention relates to dental picks.

In accordance with my invention, I provide an extremely simple and convenient holder, upon which a flexible and preferably elastic band or element may be supported in a suitably taut condition, and passed between the teeth, for removing food and accumulation of matter. The holder is particularly designed to enable the cleansing element or band to be passed between the posterior teeth, into the interproximal spaces, for thoroughly cleansing the same. The invention also resides in the provision of a flexible and yielding cleansing element or band, which is impregnated with an abrasive material, for effecting the thorough cleansing of the teeth.

In the accompanying drawings, forming a part of this specification, and in which like numerals are employed to designate like parts throughout the same, Figure 1 is a side elevation of a device embodying my invention, Figure 2 is an edge elevation of the same, Figure 3 shows detail elevations, partly in section, further illustrating the construction at the ends of the holding arms, and, Figure 4 is a side elevation, parts broken away, of the modified flexible elastic band or strip.

In the drawings, wherein for the purpose of illustration is shown a preferred embodiment of my invention, the holder is illustrated as embodying a body portion 5, which is preferably flat, and which may be formed of metal or any other suitable material. The body portion carries outwardly extending arms 6, 7, and 8, which diverge with relation to each other. The arms 6 and 7 constitute a pair and extend forwardly or longitudinally, and the arms 7 and 8 constitute a pair and extend laterally. Each of the arms 6, 7 and 8, as more clearly shown in Figure 3, is grooved at 9, providing a forked end, for the reception of a cleansing element or band 10, which also engages over a headed pin or stud 11, or other attaching element, rigidly attached to the side of the body portion 5, adjacent to the arm 8, as shown.

The body portion 5 also carries a handle 12, preferably formed integral therewith. This handle has its end provided with a recess 13 and a double headed pin 14 extends transversely through the handle and is spaced from the recess 13, but in alinement therewith. This double headed pin receives thereon additional reserve bands 10, which have their intermediate portions held within the recess 13. The handle 12 has an opening 15, for the reception of a supporting element, whereby the device may be suspended, when not in use.

In view of the foregoing description it is obvious that the cleansing element or band 10 is detachably held upon the arms 6, 7 and 8 in a secure manner. The forward portion A of the band is adapted to be more conveniently passed between the anterior teeth, while the side portion B may be conveniently passed between the posterior teeth, and freely into the interproximal spaces, occurring between the molars, for thoroughly cleansing the same.

An important feature of the invention is the peculiar construction or character of the cleansing element 10. This cleansing element or band is preferably formed of an elastic or yielding material, such as rubber, which is soft and flexible. This rubber band has an abrasive material, impregnated or embedded therein, preferably throughout the entire mass of the band. This abrasive material may be mixed with the rubber, in the plastic form, prior to its vulcanization. I also contemplate applying the abrasive material to the surfaces of the rubber, after vulcanization, by any suitable means. The fineness of the abrasive material may vary, to meet the required conditions, and each strip may be impregnated with abrasive materials of different fineness. The principal idea is to obtain a soft elastic rubber band or strip, thoroughly impregnated with powdered abrasive material, which will clean and polish the teeth, and will not injure the gum tissue. The band or strip is held taut in use, which facilitates the convenient use of the device.

In Figure 4, I have shown the cleansing element 10', which is identical with the band 10, except that the element 10' is in the form of a strip. This strip may be cut in any suitable length and is adapted to be passed between the teeth with or without the use of the holder. I contemplate attaching a metal guide or wire 16 to one end of the strip 10′, and threading this guide through the teeth, to facilitate the passing of the forward end of the strips through the teeth. The strip 10′ is of course formed of rubber and is impregnated with the more or less powdered solid abrasive material.

It is to be understood that the form of my invention herewith shown and described is to be taken as a preferred example of the same, and that various changes in the shape, size, and arrangement of parts, may be resorted to, without departing from the spirit of my invention, or the scope of the subjoined claims.

Having thus described my invention, I claim:

1. A tooth cleansing element to be passed between the teeth, comprising a strip of flexible rubber carrying abrasive material and a relatively stiff element attached to one end of the strip and adapted to be passed between the teeth to lead the strip between the same.

2. A tooth cleaning element to be passed between the teeth, comprising a strip of flexible rubber carrying abrasive material, and a wire attached to one end of the strip to be threaded between the teeth to guide the strip between the same.

3. A cleansing element to be passed between the teeth comprising a strip of soft flexible rubber having a fine abrasive material incorporated within and throughout its mass.

In testimony whereof I affix my signature.

WILLIAM F. LAWRENZ.